3,211,733
PYRIMIDYL PYRIDOTRIAZOLE BRIGHTENERS
Bennett George Buell, Somerville, and Robert Sidney Long, Bound Brook, N.J., assignors to American Cyanamid Company, Stamford, Conn., a corporation of Maine
No Drawing. Application Apr. 19, 1962, Ser. No. 188,897, which is a division of application Ser. No. 87,754, Feb. 8, 1961, which is in turn a division of application Ser. No. 698,930, Nov. 26, 1957, now Patent No. 3,058,989, dated Oct. 16, 1962. Divided and this application Aug. 25, 1964, Ser. No. 392,024
2 Claims. (Cl. 260—256.4)

This application is a division of application S.N. 188,897, filed April 19, 1962, which application is in turn a division of S.N. 87,754, filed February 8, 1961, now abandoned, said latter application being, in turn, a division of application S.N. 698,930, filed November 26, 1957, now Patent No. 3,058,989.

This invention relates to organic fibers dyed with compounds of the structure:

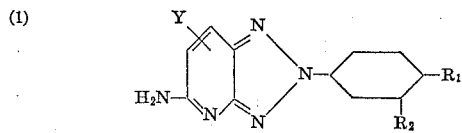

in which Y may be hydrogen, alkyl, halogen, carboxy, carbalkoxy or carboxamido, $n$ may be one or two and R is an organic radical having a 6-membered aromatic ring directly bonded to the triazole rings, the said group R being the residue of a diazotizable amine. This invention further relates to various new compounds of different structures which may be used to dye and to brighten organic fibers. More specifically, it relates to each of the separate and distinct groups of compounds listed below:

(1)

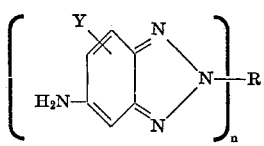

in which $R_1$ may be hydrogen, halogen, alkyl, alkoxy, amino, acylamino, carboxy or phenyl, $R_2$ may be hydrogen, alkyl or halogen, one of $R_1$ and $R_2$ not being hydrogen, and Y being defined as above in this and each succeeding formula and quaternary salts thereof.

(2)

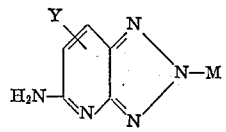

in which M is a naphthalene ring which may carry halogen, alkyl, alkoxy and sulfo groups, and quaternary salts thereof.

(3)

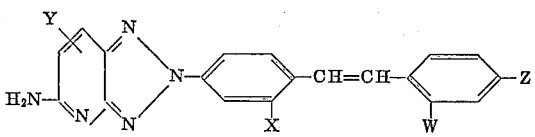

in which X may be hydrogen, sulfo or cyano; W may be hydrogen or sulfo and Z may be hydrogen, sulfo, amino or substituted amino, and quaternary salts thereof.

(4)

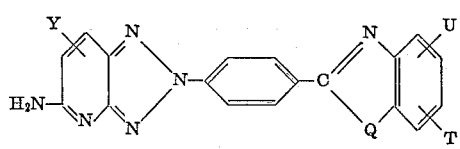

in which Q may be O, NH or S; U may be hydrogen or methyl and T may be hydrogen or sulfo, and quaternary salts thereof.

(5)

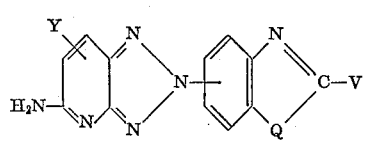

in which Q may be O, NH or S; and V may be hydrogen, alkyl, or aryl, and quaternary salts thereof.

(6)

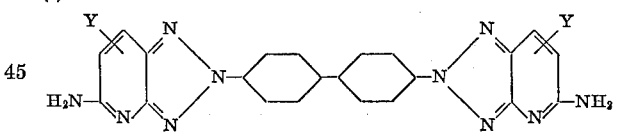

in which the biphenyl moiety may carry one sulfonic acid group ortho to the biphenyl bond, and quaternary salts thereof.

(7)

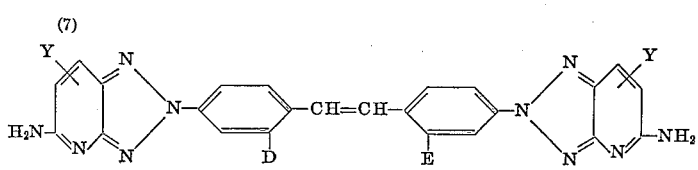

in which D and E may be hydrogen or sulfo, and quaternary salts thereof.

(8)

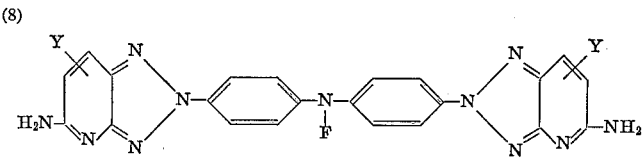

in which F may be hydrogen or lower alkyl, and quaternary salts thereof.

(9)

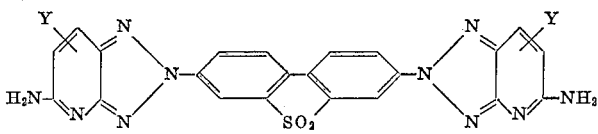

and quaternary salts thereof.

(10)

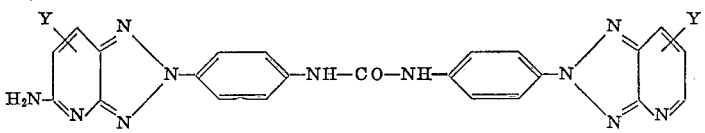

and quaternary salts thereof.

(11)

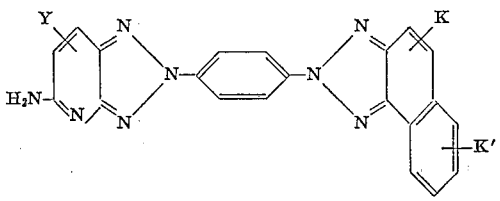

in which K and K' may be hydrogen or sulfo, and quaternary salts thereof.

(12)

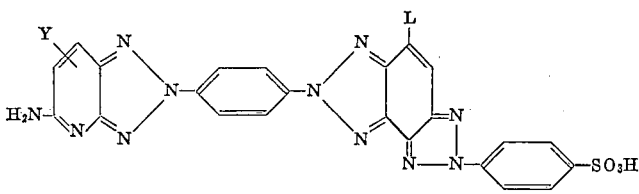

in which L may be hydrogen, methyl, methoxyl, or chloro, and quaternary salts thereof.

(13)

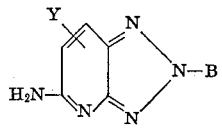

in which B is a 5-pyrimidyl radical, and quaternary salts thereof.

(14)

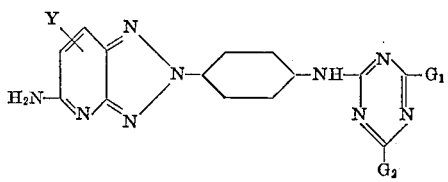

in which $G_1$ and $G_2$ can be the residue of an aliphatic amine such as ethanolamine or diethanolamine or of an aromatic amine or amino-sulfonic acid, and quaternary salts thereof.

Optical bleaching agents or brighteners are widely used in whitening and brightening textile fibers of various types and are used both during the manufacture of textiles and during the operation of laundering fabrics. When optical bleaching agents or brighteners are applied to cloth, the blue fluorescence of the brightener, excited by ultraviolet irradiation, acts to neutralize the yellowish color of the cloth, producing a whitening and brightening effect. Like any dye-stuff, a necessary property is substantivity on the cloth. Brighteners are applied from very dilute solution, and unless they are substantive on the cloth, and thus are not readily washed off, the effect will not be achieved. Various types of compounds are used as brighteners and no brightener is equally substantive on all fibers. Most brighteners are relatively non-substantive to one or another fiber, and consequently, different types of brighteners must be used for different types of fabrics. Compounds which are suitable for cellulose fibers such as cotton, are often not usable for synthetic fibers such as polyacrylonitriles or superpolyamides. Brighteners which show substantivity on most common textiles are a great need in the industry. While it is possible that no single brightener will ever be completely universal in its application, extensive research has been done in the search for at least a class of compounds which will be readily usable on any fiber or which will include members approaching universality of application.

The fluorescence of brighteners usually ceases immediately upon the removal of the source of ultraviolet light. Phosphorescence, or the continuation of emission of visible light for an appreciable time after removal of the ultraviolet source, is not a necessary characteristic for a brightener. However, phosphorescence is a property which is usable in other ways and whose importance is rapidly increasing. A particularly important application for phosphorescent compounds is in a machine in which the phosphorescent property is used for the purpose of "weft straightening." This is a process in the textile field for maintaining fill threads perpendicular to warped threads and selvages. The phosphorescent effect allows control through the use of photocells which are activated by the difference in the period of light emission by fluorescent compounds which phosphoresce, and those which do not. It is necessary to use phosphorescent compounds in such weft straightening because of the almost universal use of brighteners in the finishing of cloth. Heretofore the control was through the fluorescence of a thread dyed specially with a brightener, but now, with all threads being dyed with brighteners, the machine will not operate satisfactorily. Consequently, as described by Allen in his specification, Ser. No. 644,886 filed March 8, 1957, now U.S. Patent 2,968,856, the control is now carried out by dyeing the control threads with a phosphorescent brightener, which thus continues emitting light after the source of ultraviolet is removed.

For use in such an application, a compound must possess other properties besides fluorescence and phosphorescence. It is necessary that the compound be stable to various chemical and physical treatments when applied to the fiber or a fabric without losing the phosphorescent property and without being removed from the fiber or the fabric. Most compounds, even when they show some phosphorescence, do not withstand the harsh treatment necessary in the finishing of fabrics. Such treatment includes caustic solution at elevated temperatures, bleaching with hydrogen peroxide, steaming, and the like. There is thus a further need in the dyestuff field for a class of compounds which will phosphoresce and also which will be stable under the harsh treatments of textile manufacture.

We have found that organic fibers can be dyed readily with compounds of the formula:

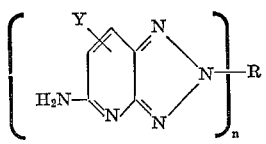

in which Y may be hydrogen, alkyl, halogen, carboxy, carbalkoxy or carboxamido; n may be 1 or 2, and R is an organic radical having a 6-membered aromatic ring directly bonded to the triazole rings, the said group R being the residue of a diazotizable amine, and that such organic fibers exhibit phosphorescence and fluorescence and are stable to the various conditions of textile manufacture. We have further found that these dyestuffs can be applied to a great variety of fibers, many of them being applicable to a greater or lesser extent to nearly all organic fibers and that, with variations in the structure, it is possible to increase the substantivity of such compounds on specific classes of organic fibers. We have further found several distinct classes of new compounds as listed above, which form a separate aspect of our invention. These classes of compounds are not equivalent, their substantivity on various fibers, their color (i.e., either fluorescence or self color as dyes), their phosphorescence and their stability to various treatments varying from group to group.

It is an advantage of our invention that by proper selection of substituents, it is possible to obtain dyeings on a wide range of organic fibers. It is known that brighteners tend to be substantive on cellulosic fibers when they are linear coplanar molecules having extended conjugation. It is surprising however, that the compounds used in our invention go on cellulosic fibers even when these structural characteristics are not prominent. Thus, 2-phenyl-6-amino-2,3-pyridotriazole is substantive on cotton, although it is not an extended linear coplanar molecule, nor is it sulfonated. However, when the substituent on the triazole ring is a simple aryl group, one obtains optimum brightening only on polyacrylonitrile fibers. Cotton brightening is obtained more readily with the use of more complicated substituents on the triazole ring or, better yet, even bis-triazoles. It is a further advantage of our invention that one readily obtains good acid solubility with pyridotriazoles, as contrasted to benzo- or naphthotriazoles. It is a further advantage of our invention that the pyridotriazoles have good affinity to many kinds of synthetic fibers, especially polyamides and polyacrylonitriles. It is a still further advantage of our invention that the pyridine ring in the pyridotriazole nucleus can be quaternized with the result that increased solubility is obtained and affinity is obtained on polyacrylonitrile fibers at a wide range of pH's.

In the preparation of compounds substantive to particular fibers, attention must be given to such factors as the type of fiber to be treated, the method of application (and the solubility properties), whether the desired effect is phosphorescence of fluorescence (and if fluorescence, whether reddish-blue or greenish-blue) and similar factors. When solubility in water is important, sulfonated aryl residues can be used. However, sulfonation has the effect of decreasing affinity on polyacrylonitrile fibers and similar non-cellulosic fibers. Greener shades of fluorescence can be attained by using suitable auxochromic substituents such as alkoxyl, dialkylamino or acylamino. One of the most useful and at the same time most unexpected advantages of the present invention is the wide variety of effects which can thus be built into the products by proper selection of the starting materials.

The dyestuffs used in the present invention are conveniently prepared by coupling an aromatic diazonium compound with a 2,6-diaminopyridine to form a 3-arylazo-2,6-diaminopyridine, which is then triazolized by an oxidative ring closure method using a mild oxidizing agent. If it is desired to quaternize, this is achieved by reaction of the triazole product with an alkylating agent such as an alkyl halide. Various aromatic amines may be used to form the diazo component in the first step of this preparation and proper selection of the amine makes it possible to produce an optical bleaching agent with properties making it suitable for use on various textile fibers. Examples of diazotizable amines which may be used in the reaction to produce compounds of the invention are:

Aniline
p- and m-Aminobenzoic acid
Alkyl and aryl p- and m-aminobenzoates
p- and m-Aminobenzenesulfonic acid and their alkyl and aryl esters
p- and m-Aminobenzenealkyl sulfones
p- and m-Aminoacetanilide
p- and m-Aminobenzanilide
p- and m-Aminoanisanilide
p- and m-Aminobutyranilide
p- and m-Toluidine
p- and m-Chloroaniline
p- and m-Bromoaniline
p- and m-Fluoroaniline
o-Xylidine (3,4-dimethylaniline)
p- and m-Anisidine
p- and m-Nitroaniline
4-aminobiphenyl
Benzidine
4-aminostilbene
4,4'-diaminostilbene-2,2'-disulfonic acid
2-napthylamine
2-aminonaphthalene-6-sulfonic acid
2-aminonaphthalene-5-sulfonic acid
2-aminonaphthalene-5,7-disulfonic acid
2-aminonaphthalene-6,8-disulfonic acid
2-(p-aminophenyl)-benzimidazole, benzoxazole and benzothiazole
5- and 6-aminobenzoxazole, -benzothiazole, -benzimidazole, -benzotriazole
4-aminopyridine
3-aminopyridine
6-methoxy-2-naphthylamine
6-chloro-2-naphthylamine These diazos are coupled with various 2,6-diaminopyridines such as the following:
2,6-diaminopyridine
2,6-diamino-3-methylpyridine
2,6-diamino-4-methylpyridine
2,6-diaminopyridine-4-carboxlic acid and its esters
2,6-diamino-3-bromopyridine
2,6-diamino-4-bromopyridine
2,6-diaminopyridine-4-carboxamide The 3-arylazo-2,6-diaminopyridine intermediate is then oxidized with a mild oxidizing agent such as air in the presence of copper sulfate, which results in ring closure to the triazole derivative.

Pyridotriazoles in which the substitutent on the triazole ring is a para-aminophenyl radical form an especially useful class of compounds for use in our invention, since they can be intermediates for the further preparation of more complicated brighteners and phosphorescent agents which can also be used in our invention. For example, the amino group on this phenyl ring can be diazotized and coupled into other coupling components and, when the coupling component is so constituted that an o-aminoazo compound is formed, this too can be triazolized to give a bis- or poly-triazole derivative. Thus, a bis-triazolo compound, either symmetrical or unsymmetrical is readily produced. The symmetrical bis-triazolo compounds are also readily produced from tetrazotization of an aromatic diamine.

The fibers which may be used in preparing the dyed fibers of our invention include the various organic fibers used in the textile industry, both synthetic and natural, since substantivity and other properties can be varied by the choice of the proper substituents and the proper ring groupings in the brightener molecule to favor substantivity on any particular type of fiber. Among the fibers which may be used are the natural fibers, both cellulosic and non-cellulosic, such as cotton, wool, silk, and the like, and the synthetic fibers of both the cellulosic and non-cellulosic types such as viscose rayon (i.e., regenerated cellulose) cellulose esters such as cellulose acetate, polyacrylonitrile (either the homopolymer or copolymers with various comonomers such as vinyl pyridine, methyl acrylate, vinyl chloride, and the like), superpolyamides such as hexamethylene polyadipamide and poly-omega-aminocaproamide, and superpolyesters such as polymeric glycolterephthalate.

The brighteners to be used in our invention are especially useful on those fibers for which most known brighteners have been not satisfactory, such as the polyacrylics and the superpolyesters.

The brighteners may be applied as optical bleaching agents or as phosphorescent agents from detergent compositions as ordinarily formulated in the art, or from rinsing liquors for treatment during textile manufacture or after laundering operations.

In addition to being useful as brightening agents, the products used in the preparation of our invention are also phosphorescent and thus the dyed fibers of our invention can be used where phosphorescence is important for special effects. 2-phenyl-6-amino-pyridotriazole is especially useful for this purpose because of its phosphorescence and its substantivity to a wide variety of fibers. A particularly important application for such phosphorescent dyed fibers is in a machine in which the phosphorescent property is utilized for the purpose of "weft straightening," a process in the textile field for maintaining fill threads perpendicular to warp threads and selvages. As described above, it is necessary for such application to have compounds which will stand rather drastic treatment. It is an advantage of the dyed fibers of our invention that they are able to withstand the treatment with caustic solution at elevated temperatures and similar drastic treatments, and that they show sufficient phosphorescence.

Our invention includes not only organic fibers dyed with a broad class of pyridotriazole compounds, but also specific groups falling within this broad class of compounds which have distinct and separate properties. These are all prepared in the same manner as described in general for the class, i.e., by the coupling of an aromatic diazo compound into a 2,6-diaminopyridine. Thus, in each class the pyridines which may be used as the starting material are the same, but the diazotizable amine which is used varies with the class of compounds being considered.

In the class of compounds of the structure:

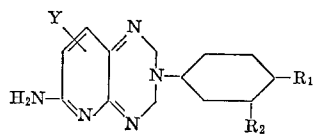

the amino compounds which may be used as starting materials include.

p-Chloraniline
p-Toluidine
p-Anisidine
p-Phenetidine
p-Nitroaniline
p-Phenylenediamine
Monoacylated p-phenylenediamines;
  such as p-acetamidoaniline
p-Benzamidoaniline
p-Propionylamimoaniline, and the like
p-Aminobenzoic acid
4-aminodiphenyl
4-chlor-3-methylaniline
4-bromo-3-ethylaniline
4-chlor-3-butylaniline
3,4-dichloroaniline
3-chlor-p-anisidine
m-Bromaniline, and the like.

The amines which may be used to prepare compounds of the class of the structure:

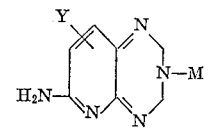

include beta-naphthylamine, 2-aminonaphthalene-6-sulfonic acid, 2-aminonaphthalene-5-sulfonic acid, 2-aminonaphthalene-4,6-disulfonic acid, 2-aminonaphthalene-5,7-disulfonic acid, 2-aminonaphthalene-6,8-disulfonic acid, 2-aminonaphthalene-4,8-disulfonic acid, 6-methoxy-2-naphthylamine, 6-chloro-2-naphthylamine, and the like.

The amines which can be used to prepare the compounds of the structure:

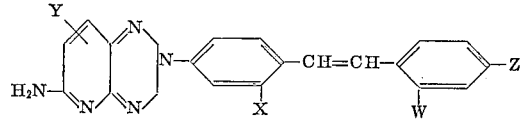

include 4-aminostilbene, 4-aminostilbene-2,2'-disulfonic acid, 4-aminostilbene-2-sulfonic acid, 2-cyano-4-aminostilbene, 4-amino-4'-nitrostilbene-2,2'-disulfonic acid, 2-(4-aminostilbyl)-methyl sulfone, and the like.

The amines which may be used to prepare the class of compounds of the formula:

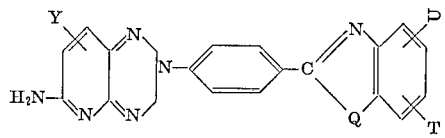

include dehydrothiotoluidine, dehydrothiotoluidine sulfonic acid, 4'-amino-2-phenyl benzoxazole, 4'-amino-2-phenyl-benzimidazole, and the like.

In the preparation of compounds of the class:

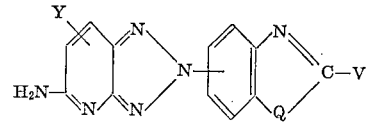

the following amines may be used: 5- or 6-aminobenzothiazole, 2-methyl-5- or 6-aminobenzothiazole, 2-phenyl-5- or 6-aminobenzothiazole, 5- or 6-aminobenzoxazole, 2-phenyl-5- or 6-aminobenzoxazole, 2-methyl-5- or 6-aminobenzoxazoles, 5-aminobenzimidazole, 2-methyl-5 (6)-aminobenzimidazole, 2-phenyl-5-(6)-aminobenzimidazole, and the like.

In the preparation of compounds of the structure:

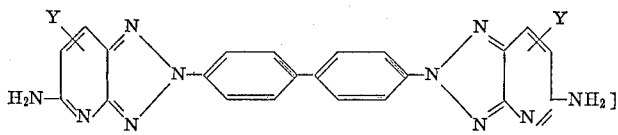

the starting material which is used as the diazotizable amine may be benzidine or a benzidine monosulfonic acid in which the sulfonic acid group is ortho to the biphenyl bond.

Compounds of the type:

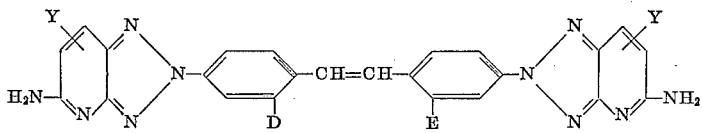

can be prepared by starting with such diamines as 4,4'-diaminostilbene-2,2'-disulfonic acid and 4,4'-diaminostilbene, as well as 4-amino-4'-nitro diamino stilbene and the corresponding disulfonic acid, in which case the preparation requires several steps, a diazotization of the amino group followed by coupling, after which the nitro group is reduced and the diazotization and coupling is repeated. These products are yellow fluorescent dyes.

Compounds of the structure:

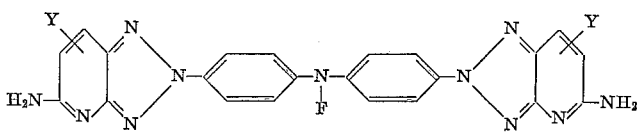

can be prepared starting with such compounds as 4,4'-diaminodiphenylamine, 4,4'-diaminodiphenyl methyl amine, 4,4'-diaminodiphenyl ethyl amine, 4,4'-diaminodiphenyl butyl amine, and the like.

The starting material for compounds of the structure:

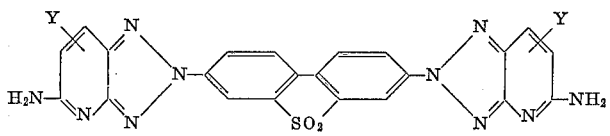

is 3,7-diamino-dibenzothiophene-5,5'-dioxide.

Compounds of the formula:

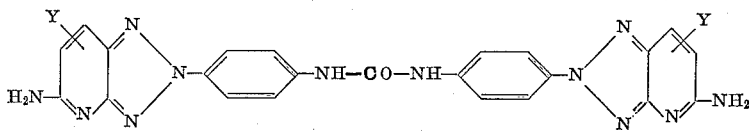

are prepared from 4,4'-diamino-N,N'-diphenylurea.

Compounds of the structure:

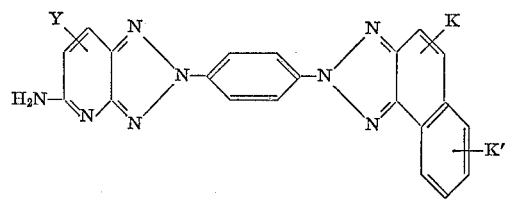

are prepared by starting with either para-nitroaniline for the first coupling into the 2,6-diaminopyridine derivative or similarly from an acylaminoaniline. After this first coupling, either the nitro group is reduced or the acyl group is hydrolyzed and the freed amino group is then diazotized and coupled into a naphthylamine, followed by triazolization. The naphthylamine can be 2-naphthylamine, 2-naphthylamine-4-sulfonic acid, 2-naphthylamine-5-sulfonic acid, naphthionic acid, Laurent's acid, 2-naphthylamine-6-sulfonic acid, 2-naphthylamine-5-sulfonic acid, 2-naphthylamine-4,6-, 5,7- or 6,8-disulfonic acid, 6-methoxy-2-naphthylamine, 6-chloro-2-naphthylamine, and the like.

The compounds of the structure:

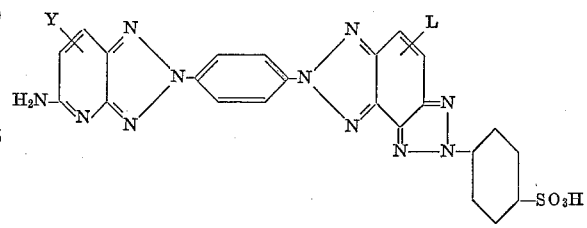

in which L may be hydrogen, methyl, methoxyl, or chloro, are similarly prepared by a second diazotization and coupling and triazolization, this time by coupling into 6-amino-5-substituted 2-para-sulfophenyl benzotriazole and performing a second triazolization. The substituent on the coupling component for the second triazolization can be hydrogen, methyl, methoxyl or chloro.

Compounds of the type:

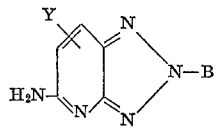

in which B is a 5-pyrimidyl nucleus are obtained by coupling a diazotized amino pyrimidine into a 2,6-diamino pyridine and triazolizing. For this purpose one can use 5-amino pyrimidine, substituted 5-amino pyrimidines, and the like.

Compounds of the type:

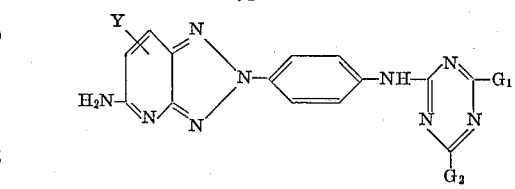

are prepared by reacting the intermediate 2-p-aminophenyl-6-aminopyridotriazole with cyanuric chloride, followed by further reaction of the product with aliphatic amines such as alkyl amines or preferably substituted alkylamines (ethanolamine, diethanolamine, morpholine, etc.) or with aromatic amines or aminosulfonic acids such as aniline, sulfanilic acid, and the like.

In all these various classes of dyestuffs, as well as in the principal invention of the dyed fibers, the pyridine ring in the pyridotriazole moiety can be quaternized by treatment with an alkylating agent to form a quaternary compound on the pyridine ring nitrogen. Examples of alkylating agents which may be used are methyl iodide, ethyl bromide, butyl bromide, benzyl bromide, dimethyl sulfate, diethyl sulfate, ethylene chlorohydrin, beta-diethylamino ethyl chloride, alkyl tosylates such as methyl tosylate, and the like. Among the purposes of such quaternization are to get increased water solubility of the brightener molecule and to permit the application of the dyestuff over a broader range of pH. The quaternized brighteners are in general equivalent to the unquaternized brighteners, and in some cases superior, in substantivity to various fibers. Consequently, the quaternized compounds and the fibers dyed with them form a part of our invention.

Our invention can be illustrated by the following examples in which parts are by weight unless otherwise indicated.

*Example 1*

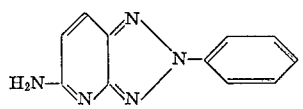

A mixture of 27.9 parts of 2,6-diamino-3-phenyl-azopyridine (commercially available as "Pyridium" or "Azoimide"), 450 parts of ethanol, 70 parts of water and 180 parts of concentrated ammonium hydroxide is heated under reflux with stirring. A hot solution of 170 parts of copper sulfate in 500 parts of water and 300 parts of concentrated ammonium hydroxide is added. After heating for several hours, an additional portion of 25 parts of copper sulfate in 125 parts of water and 45 parts of concentrated ammonium hydroxide is added and heating is continued until the reaction is substantially complete, as shown by disappearance of the starting material. After cooling the mixture, the product is removed by filtration and washed thoroughly with dilute ammonium hydroxide and water to remove the copper. The product is purified by dissolving in 400 parts of water, 450 parts of ethyl alcohol, and 150 parts of concentrated hydrochloric acid. After treatment with a decolorizing agent and filtering, the filtrate is treated with 55 parts of concentrated hydrochloric acid. On cooling, the hydrochloride of the product separates as cream colored rods, is removed by filtration and then washed with alcohol.

*Example 2*

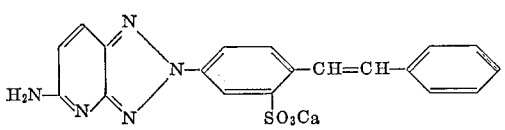

A diazonium solution is prepared from 2.75 parts of 4-amino-stilbene-2-sulfonic acid by diazotization with sodium nitrite. The diazonium solution is combined with a solution of 1.09 parts of 2,6-diaminopyridine in 75 parts of acetic acid, 50 parts of water and 2.2 parts of concentrated hydrochloric acid. With stirring, 50 parts of a saturated solution of sodium acetate is added slowly and stirring is continued until coupling is complete. The solid aminoazo compound is removed by filtration and washed with water and is then taken up in 90 parts of 95% ethanol, 22 parts of concentrated ammonium hydroxide and 20 parts of water. The mixture is heated to the boiling point and a hot solution of 17 parts of copper sulfate, 75 parts of water, and 36 parts of concentrated ammonium hydroxide is added and the mixture is heated at the reflux temperature with stirring until the reaction is complete. After the mixture is cooled, the solid is removed by filtration, slurried in dilute hydrochloric acid and then again isolated by filtration. For purification, it is dissolved in methyl Cellosolve containing a small amount of sodium hydroxide and after clarification with a decolorizing agent, the product is isolated from the filtrate by adding additional sodium hydroxide solution and saturated sodium acetate. After stirring, the product is isolated as a light tan sodium salt.

*Example 3*

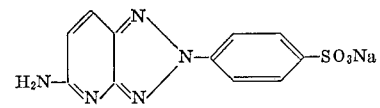

The procedure of Example 2 is followed, except that an equivalent quantity of sulfanilic acid is substituted for the 4-aminostilbene-2-sulfonic acid. The product is obtained as an almost white sodium salt.

*Example 4*

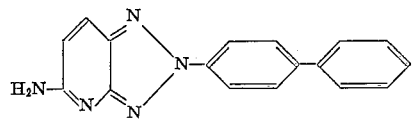

A diazonium solution is prepared by diazotizing 3.38 parts of 4-aminobiphenyl with sodium nitrite in acetic acid at 30° C. The diazonium solution is combined with a solution of 2.18 parts of 2,6-diaminopyridine in 100 parts of acetic acid, 100 parts of water, and 4 parts of concentrated hydrochloric acid. With stirring, 75 parts of saturated sodium acetate solution is added. The mixture is stirred until the coupling is complete and the light orange coupling product is removed by filtration and triazolized by oxidation with copper sulfate and ammonium hydroxide as described in Example 2. The product is purified by dissolving in about 600 parts of hot methyl cellosolve and excess concentrated hydrochloric acid, clarifying with a decolorizing agent and isolating by the addition of 300 parts of water and excess ammonium hydroxide to the filtrate.

*Example 5*

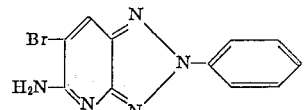

The procedure of Example 4 is followed except that an equivalent quantity of 2,6-diamino-3-bromo-pyridine is used in place of the 2,6-diaminopyridine and an equivalent quantity of aniline is used in place of the 4-aminobiphenyl. The corresponding methyl compound is prepared by starting with 2,6-diamino-3-methyl-pyridine.

*Example 6*

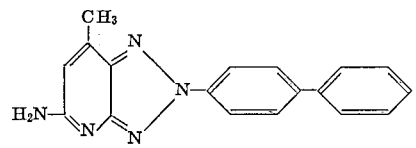

The procedure of Example 4 is followed except that an equivalent quantity of 2,6-diamino-4-picoline is used in place of the 2,6-diaminopyridine.

*Example 7*

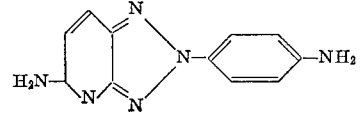

A diazonium solution is prepared by diazotizing 13.8 parts of 4-nitro-analine with sodium nitrite. The solution is combined with a solution of 10.9 parts of 2,6-diaminopyridine in 500 parts of acetic acid, 500 parts of water and 18 parts of concentrated hydrochloric acid. With stirring, the mixture is neutralized with saturated sodium acetate solution and the bright redo-aminoazo product which forms is removed by filtration and washed with water. This o-aminoazo product is taken up in 540 parts of ethanol, 150 parts of water, and 135 parts of concentrated ammonium hydroxide. The mixture is heated and a hot solution of 125 parts of copper sulfate, 500 parts of water, and 225 parts of ammonium hydroxide is added. The mixture is heated at the reflux temperature until the triazolization is complete, cooled, and the product is removed by filtration. This nitro compound is then reduced to the corresponding amino compound by the following procedure:

The nitro compound is added to 150 parts of water, 45 parts of ethanol and 120 parts of 5 N sodium hydroxide. To the mixture at 70–85° C. is added 70 parts of sodium hydrosulfite. After stirring and cooling, the product is isolated by filtration and washed alkali-free with water. The amino compound is purified by clarification with a decolorizing agent from solution in 250 parts of hot 4 N hydrochloric acid, and isolated by making the filtrate alkaline by the addition of ammonium hydroxide.

*Example 8*

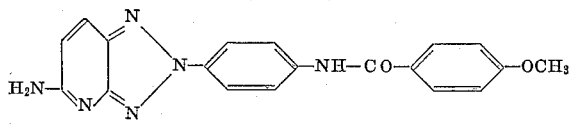

To 0.75 part of 6-amino-2-(p-aminophenyl)-2-pyrido[2,3-d]-v-triazole (prepared as in Example 7) is added 25 parts of pyridine and 0.7 part of p-anisoyl chloride. The mixture is heated at the reflux temperature for a short time and is then drowned in ice. The solid product which forms is removed by filtration and washed with water and is purified by recrystallization from methyl Cellosolve, giving the product in the form of prisms with a melting point of 293–296° C.

By the use of equivalent amounts of other acyl halides in place of the p-anisoyl chloride such as acetyl chloride, butyryl chloride, stearyl chloride, benzoyl chloride, 2,4-dichlorobenzoyl chloride, and similar compounds, the corresponding acylamide compounds are obtained.

*Example 9*

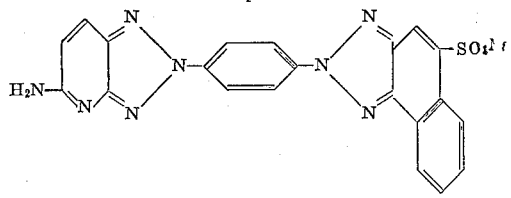

A diazonium solution prepared by diazotizing 2.26 parts of 6-amino-2-(p-aminophenyl)-2-pyrido 2,3-d-v-triazole (prepared as in Example 7) is combined with a slurry of 2.54 parts of sodium naphthionate in 100 parts of water, 4 parts of hydrochloric acid and 50 parts of acetic acid. With stirring, 50 parts of saturated sodium acetate solution is added and the stirring is continued until the coupling is complete (4 hours). The o-aminoazo product is removed by filtration and triazolized by oxidation using the procedure described in Example 7. Purification of this bis-triazolyl product is effected by dissolving the product in 400 parts of hot monoethanolamine, and 4 parts of 5 N sodium hydroxide solution. After clarification with a decolorizing agent, 100 parts of water is added to the filtrate and the sodium salt of the product is salted out by the addition of sodium hydroxide, giving a crystalline yellow product.

*Example 10*

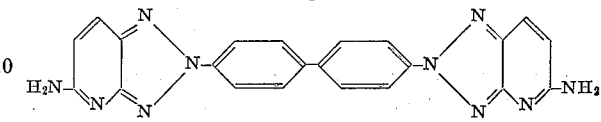

A tetrazonium solution prepared by tetrazotizing 1.86 parts of benzidine in 100 parts of water, 9 parts of hydrochloric acid and 8 parts of 1 N sodium nitrite solution is combined with a solution of 2.4 parts of 2,6-diaminopyridine in 100 parts of water and 5 parts of concentrated hydrochloric acid. The mixture is neutralized to Congo red indicator by addition of saturated sodium acetate solution (about 60 parts). The color changes from blue-black to dull orange. After stirring the mixture, the solid azo product is removed by filtration.

For conversion to the triazole derivative the disazo product from above is slurried in a hot mixture of 150 parts of pyridine and 20 parts of concentrated ammonia. A half-portion of a solution of 24 parts of copper sulfate, 100 parts of water and 40 parts of ammonia is added and the mixture is heated for several hours. The other half of the copper sulfate solution is then added and the mixture is heated until the reaction is complete. The solid material is removed by filtration and purified by recrystallization from about 300 parts of N-methyl-2-pyrrolidone.

*Example 11*

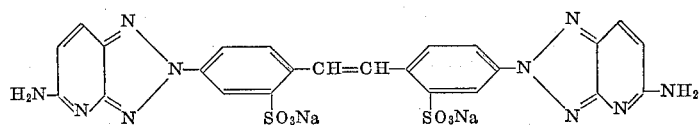

A tetrazonium solution is prepared by tetrazotizing 37 parts of 4,4'-diaminostilbene-2,2'-disulfonic acid. This is done by first dissolving the stilbene derivative in 150 parts of water and 7 parts of 5 N sodium hydroxide solution. Twenty-one parts of 1 N sodium nitrite solution is added and after filtering, the solution is poured into a mixture of 200 parts of ice and 16 parts of hydrochloric acid. After stirring for a short period, the excess nitrite is destroyed with sulfamic acid.

To the above brown slurry is added a solution of 2.4 parts of 2,6-diamino-pyridine in 150 parts of water and 5 parts of concentrated hydrochloric acid. Saturated sodium acetate solution is added until the mixture is neutral to Congo red indicator. Coupling takes place rapidly and after stirring, the solid disazo compound is removed by filtration and triazolized by the procedure described below.

The solid product is dissolved in a hot mixture of 150 parts of pyridine and 20 parts of ammonium hydroxide. To this is added a half portion of a solution of 24 g. copper sulfate, 100 parts of water and 20 parts of concentrated ammonia. After heating a short period, the second half portion of the copper sulfate solution is added and the mixture is heated until the reaction is complete. The solid bis-triazolo compound is removed by filtration.

The product may be purified by recrystallizing from hot dimethyl formamide containing a small amount of caustic and then precipitating the product from the cooled dimethylformamide filtrate by addition of water and hydrochloric acid to the neutral point.

Example 12

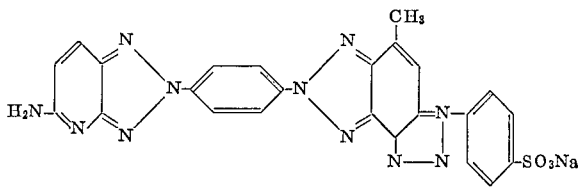

A diazonium solution prepared by diazotization of 2.26 parts of 6-amino-2-(p-aminophenyl)-2-pyrido-[2,3-d]-trizaole with sodium nitrite in hydrochloric acid solution is combined with a solution of 3.04 parts of 6-amino-2H-5-methyl-2-(p-sulfophenyl)-benzotriazole in 160 parts of acetone, 100 parts of water and 4 parts of concentrated hydrochloric acid. With stirring, 50 parts of saturated sodium acetate solution is added and the mixture is then stirred until the coupling is complete (4 hours). The resulting o-aminoazo product is removed by filtration and then triazolized by oxidation with copper sulfate using the procedure described in Example 6. The product is isolated as the sodium salt and purified by treatment with decolorizing charcoal in hot dimethyl formamide solution, giving the product as the purified sodium salt.

Example 13

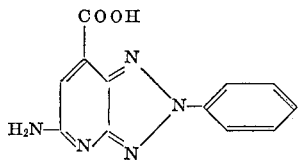

The procedure of Example 1 is followed except that an equivalent amount of 2,6-diaminopyridine-4-carboxylic acid is used in place of the 2,6-diaminopyridine.

Example 14

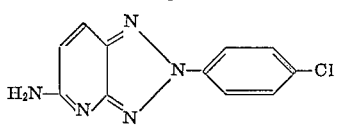

The procedure of Example 4 is followed using an equivalent amount of para-chloraniline in place of the 4-aminobiphenyl. Similarly, if one uses any of the following substituted anilines in place of aniline in the procedure of Example 4, one obtains the product having the corresponding substitution: para-toluidine, para-anisidine, para-butylaniline, para-propylaniline or paraminobenzoic acid.

Example 15

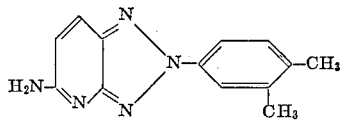

The procedure of Example 4 is followed using an equivalent quantity of 3,4-dimethylaniline in place of the 4-aminobiphenyl. Similarly, other substituted products are obtained if one uses 3-chloro-4-methyl-aniline or 4-chloro-3-methylaniline in place of the dimethylaniline.

Example 16

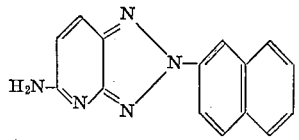

The procedure of Example 4 is followed using an equivalent quantity of beta-naphthylamine in place of the 4-aminobiphenyl. Corresponding substituted compounds are obtained by using such derivatives as Bronner's acid, Dahl's acid, amino J acid and amino G acid in place of beta-naphthylamine.

Example 17

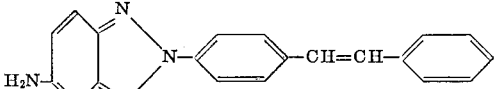

The procedure of Example 4 is followed using 4-aminostilbene in equivalent quantities in place of the 4-aminobiphenyl. The product is a good brightener for nylon.

Example 18

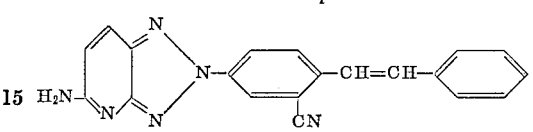

A mixture of 30 parts of 2-cyano-4-nitrotoluene, 22 parts of benzaldehyde and 5 parts of piperidine is heated at 125°–140° C. until the reaction is substantially complete. The melt is dissolved in 160 parts of hot glacial acetic acid and on cooling the crystalline solid which forms is filtered. To a boiling suspension of 9 parts of the above product in 250 parts of 95% alcohol is added a solution of 44 parts of hydrated stannous chloride and 44 parts of concentrated hydrochloric acid. The mixture is heated at reflux temperature until reduction is substantially complete. The mixture is then cooled and the solid is removed by filtration. It is purified by slurrying in dilute sodium hydroxide solution.

A solution of 4.4 parts of the 4-amino-2-cyano-stilbene so produced in 120 parts of acetic acid is prepared and to it is added 8.4 parts of concentrated hydrochloric acid. Twenty-two parts of N/1 sodium nitrite solution is then added with cooling, and after stirring for a short period the excess nitrite is discharged by the addition of sulfamic acid. The diazo solution is then used to couple with a solution of 3 parts of 2,6-diaminopyridine in 100 parts of acetic acid, 100 parts of water and 4 parts of concentrated hydrochloric acid by the procedure of Example 4.

Example 19

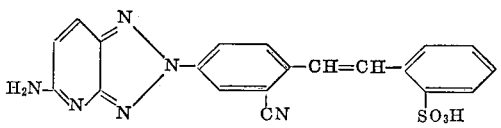

To a hot well-stirred solution of 22.9 parts of the sodium salt of benzaldehyde ortho sulfonic acid and 16.2 parts of 5-nitro-orthotoluonitrile in 40 parts of pyridine there is added 2 parts of piperidine and 9.2 parts of sodium bicarbonate. The mixture is heated on a steam bath until the reaction is substantially complete. During the heating period, an additional 40 parts of pyridine is added. The mixture is then diluted with 200 parts of water and the pyridine is stripped out with steam. The mixture is cooled with ice and the precipitated product is isolated by filtration and dried.

To a vigorously stirred mixture of 29.5 parts of iron powder, 150 parts of water and 4 parts of glacial acetic acid heated under reflux there is gradually added 11.8 parts of the product of the preceding paragraph. The mixture is heated under reflux with good stirring until the reaction is substantially complete and then is neutralized with a small excess of soda ash. The iron sludge is filtered and washed with hot methanol and the filtrate and washings are treated hot with charcoal. The mixture is filtered and the filtrate is acidified with concentrated hydrochloric acid. The precipitated 4-amino-2-cyano-stilbene-2′-sulfonic acid is isolated by filtration and purified by recrystallization from alcoholic methanol followed by reprecipitation with hydrochloric acid.

An equivalent quantity of the above product is used in the procedure of Example 2 in place of the 4-amino-stilbene-2-sulfonic acid used in that example.

Example 20

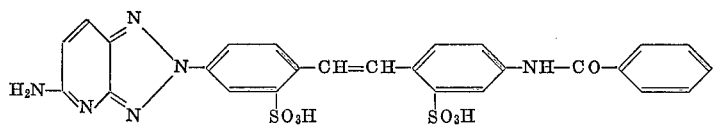

The procedure of Example 2 is followed using an equivalent quantity of 4-amino-4'-nitrostilbene-2,2'-disulfonic acid. The nitro group is then reduced and acylated as in Example 8, using benzoyl chloride.

Example 21

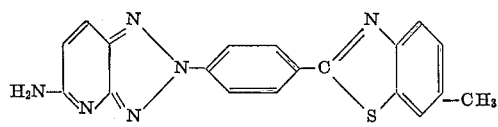

The procedure of Example 4 is followed using an equivalent quantity of dehydrothioparatoluidine in place of the 4-aminodiphenyl. A sulfonated derivative of the above product is prepared by following the procedure of Example 2 and starting with an equivalent quantity of dehydrothioparatoluidine sulfonic acid in place of the aminostilbene sulfonic acid.

Example 22

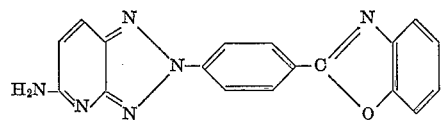

The procedure of Example 4 is followed using an equivalent quantity of 4'-amino-2-phenylbenzoxazole in place of the 4-aminodiphenyl.

Example 23

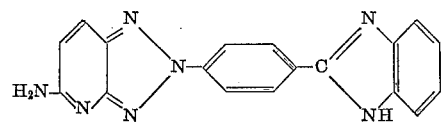

The procedure of Example 4 is followed using an equivalent quantity of 4'-amino-2-phenylbenzimidazole in place of the 4-amino-biphenyl.

Example 24

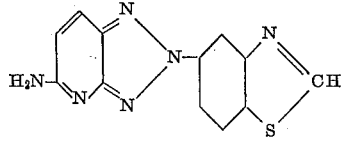

The procedure of Example 4 is followed using an equivalent quantity of 5-aminobenzothiazole in place of 4-aminodiphenyl. Similarly, equivalent quantities of 5-amino-2-methylbenzothiazole and 5-amino-2-phenylbenzothiazole can be used to give the corresponding substituted products.

Example 25

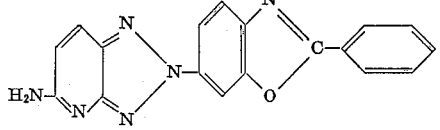

The procedure of Example 4 is followed using 6-amino-2-phenylbenzoxazole in equivalent quantities in place of 4-aminodiphenyl. If 6-aminobenzoxazole or 6-amino-2-methylbenzoxazole is used in equivalent quantities the corresponding brightener compound is obtained.

Example 26

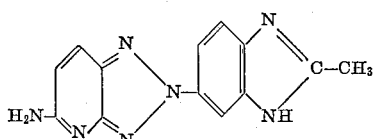

The procedure of Example 4 is followed using an equivalent quantity of 5(6)-amino-2-methylbenzimidazole in place of 4-amino-diphenyl.

Example 27

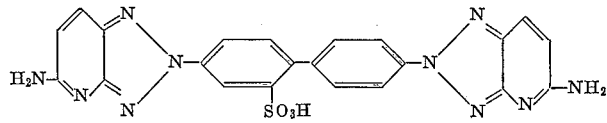

The procedure of Example 11 is followed using an equivalent quantity of benzidine-2-sulfonic acid in place of diaminostilbene disulfonic acid.

Example 28

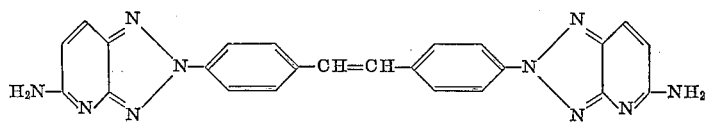

The procedure of Example 10 is followed using an equivalent quantity of 4,4'-diaminostilbene in place of the benzidine. The corresponding monosulfonic acid is prepared if the procedure of Example 11 is followed with 4,4'-diaminostilbene monosulfonic acid.

Example 29

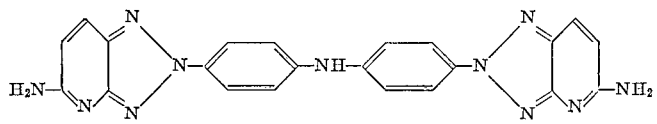

The procedure of Example 10 is followed using an equivalent quantity of 4,4'-diaminodiphenylamine in place of the benzidine. The corresponding alkyl compounds are prepared if equivalent quantities of 4,4'-diphenylmethylamine and 4,4'-diphenylbutylamine are used in place of the 4,4'-diphenylamine above.

Example 30

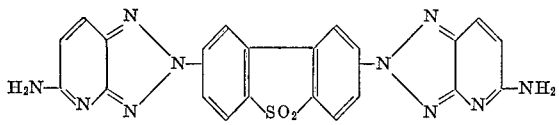

The procedure of Example 10 is followed using an equivalent quantity of 3,8-diaminodibenzothiophene-5,5'-dioxide in place of the benzidine. The corresponding sulfonated products are prepared by following the procedure of Example 11 using as starting materials equivalent amounts of 3,8-diaminodibenzothiophene-5,5'-dioxide-2,7-disulfonic acid or the corresponding monosulfonic acid.

Example 31

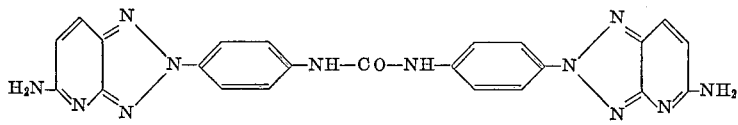

The procedure of Example 10 is followed using an equivalent quantity of 4,4'-diaminodiphenylurea in place of the benzidine.

Example 32

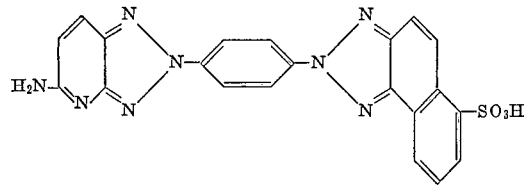

The procedure of Example 9 is used using 2-naphthylamine-5-sulfonic acid in place of naphthionic acid. The corresponding disulfonated product is obtained by using an equivalent quantity of 2-naphthylamine-4,6-disulfonic acid in place of the naphthionic acid. If the naphthionic acid is replaced with beta-naphthylamine the corresponding unsulfonated product is obtained.

Example 33

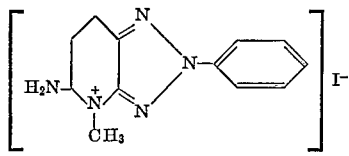

A mixture of 1 part of 5-amino-2-phenyl-(2)-pyrido [2,3-d]-v-triazole (prepared as in Example 1), 40 parts of methanol and 44 parts of methyl iodide is heated at the reflux temperature until the reaction is completed, and is then evaporated to dryness. The yellow solid which is obtained is purified by precipitating from a methanol solution by the addition of diethyl ether, giving one part of white solid product which is soluble in water.

Similar quaternary derivatives are obtained by the use of ethyl bromide, butyl bromide, benzyl chloride, allyl bromide, and ethylene chlorohydrin in place of the methyl iodide, although the chlorides and bromides take a longer time to give complete reaction. In cases where the solubility of the product was not sufficiently high, improved characteristics may be obtained by metathetical exchange of the anion to form the corresponding acetate or nitrate or other salt.

Example 34

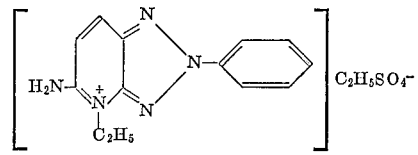

A mixture of 21 parts of 5-amino-2-phenyl-(2)-pyrido-[2,3-d]-v-triazole, 24 parts of diethylsulfate and 100 parts of ethanol is heated at the reflux temperature until the reaction is complete.

The crystalline solid which forms is removed by filtration.

By using an equivalent amount of dimethyl sulfate in place of the diethyl sulfate, the corresponding methyl compound is obtained.

Example 35

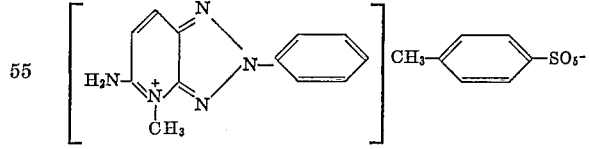

A mixture of 21 parts of 5-amino-2-phenyl-(2)-pyrido-2,3-d-v-triazole, 32 parts of methyl p-toluene-sulfonate and 100 parts of ethanol is heated at the reflux temperature until the reaction is complete. After cooling, the solid is removed by filtration giving a water soluble product.

When the methyl p-toluene sulfonate is replaced by an equivalent amount of methyl p-bromobenzene sulfonate the corresponding p-bromobenzene sulfonate salt is obtained.

Example 36

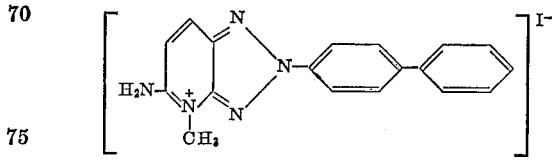

The procedure of Example 33 is followed using the product of Example 6 instead of the product of Example 1. The product of the above structure shows more affinity for some fibers than does the product of Example 6 and on other fibers is equivalent to the unquaternized product.

*Example 37*

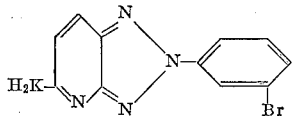

The diazonium solution from 0.03 mole of m-bromoaniline is combined with a chilled solution of 3.27 parts (0.03 mole) of 2,6-diaminopyridine in 225 parts of water and 5 parts of concentrated hydrochloric acid. Twenty-five parts of a saturated solution of sodium acetate is added dropwise with stirring. The mixture is stirred until the coupling is completed. An orange product is filtered and allowed to drain.

The product is taken up in 92 parts of ethanol, 16 parts of water, 45.8 parts by volume of concentrated ammonia and 10 parts of pyridine and the mixture is heated with stirring. A hot solution of 38.9 parts of copper sulfate in 115 parts of water and 68.7 parts by volume of concentrated ammonia is added, a stream of air is introduced, and the mixture is refluxed with stirring until the reaction is substantially complete. It is cooled and the product is filtered, washed with water and dilute ammonia, dissolved in hot dilute ethanolic hydrochloric acid, filtered hot with charcoal and filtered again. The clarified solution is left standing and gradually yields orange crystals. A hot dilute ethanolic solution of this product is clarified with charcoal made alkaline to phenolphthalein and treated with sodium hydrosulfite at the boil. A shiny yellow product is filtered and dried at 60° C.

*Example 38*

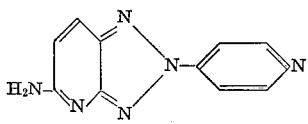

To 40 parts by volume of concentrated sulfuric acid is added with stirring, 2.8 parts (0.04 mole) of finely ground sodium nitrite, keeping the temperature below 50° C. The resulting solution is cooled to 5° C. and a solution of 4.0 parts of 4-aminopyridine in 10 parts of glacial acetic acid is added dropwise at temperatures below 15° C. The mixture is stirred until diazotization is complete. The diazonium solution is combined with a solution of 0.04 mole of 2,6-diaminopyridine in 25 parts of glacial acetic acid at temperatures below 15° C. The brown solution is stirred until coupling is complete and then drowned on 30 parts of ice, and neutralized to pH of 7.8 with dilute caustic. The product is then filtered and dried and recrystallized from absolute methanol.

The coupling product is added to a hot solution of 5.0 parts of copper sulfate, 12.5 parts of water and 25 parts of pyridine and the mixture is refluxed until the reaction is complete. It is then steam stripped to remove the pyridine, acidified, cooled and filtered. The orange product is dissolved in hot dilute acid, filtered and dilute caustic solution is added to precipitate the product. This is then dissolved in hot alcoholic HCl and precipitated with concentrated ammonia to insure removal of the copper ions. A cream colored product is filtered, washed with water, and dried at 100° C.

*Example 39*

An 0.005% solution of the brightener of Example 1 is prepared by dissolving 1 part of the brightener in 1000 parts of dimethyl formamide at room temperature. This is then diluted with water containing a small amount of dispersing agent (Triton X–100) to the 0.005% concentration. This solution is used in the following dyeing procedure:

To a mixture of 98.5 parts of water and 1.5 parts of 10% acetic acid solution is added 50 parts of 0.005% brightener solution from above. A 5-part piece of polyacrylonitrile fabric (Orlon) is added and the temperature is raised to the boiling point and held there for about 30 minutes. The fabric is removed, rinsed in water and dried in the air. It is much whiter and brighter in appearance than a piece of the untreated Orlon fabric.

*Example 40*

An 0.005% solution of the brightener of Example 33 is prepared by dissolving 1 part of brightener in 1000 parts of boiling water and diluting with water to the 0.005% concentration.

To a mixture of 98.5 parts of water and 1.5 parts of 10% acetic acid solution is added 50 parts of the 0.005% brightener solution. To the resulting acetic acid solution of the brightener is then added a 5-part piece or Orlon fabric (polyacrylonitrile). The temperature is raised to the boiling point and held there for 30 minutes. The fabric is removed, rinsed in water and dried. It is much whiter and brighter in appearance than a piece of the untreated Orlon fabric.

*Example 41*

To a solution of 0.025 part of the product of Example 1 is added 0.5 part of sodium sulfate. A piece of cotton cloth weighing 5.0 parts is added and the dyebath is heated to 130° F. After 15 minutes, another 0.5 part of sodium sulfate is added and heating is continued for another 15 minutes. The cloth is then removed, rinsed at 80° F., and dried. The dyed cloth is exposed to UV light in a darkroom. After removing the source of the UV light it is observed that the emission of visible light continues for a noticeable period.

The dyed cloth is immersed in a 5% sodium hydroxide solution and steamed at one to two pounds pressure for 1½ hours. The cloth is then rinsed and immersed in a bleaching solution formulated with hydrogen peroxide and sodium silicate, after which it is then steamed again at one to two pounds pressure for one hour. After rinsing in dilute acetic acid and water and then drying, the dyed cloth is again exposed to UV light. After the removal of the source of the UV light, the emission of visible light continues for a noticeable period, showing that the phosphorescent property of the cloth is retained after the above finishing treatments, typical of those to which fabrics are subjected in manufacture.

*Example 42*

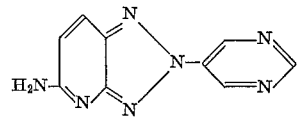

The procedure of Example 38 is followed using an equivalent quantity of 5-aminopyrimidine in place of the 4-aminopyridine. The product has the above formula.

We claim:
1. A compound selected from the group consisting of (1) those of the formula:

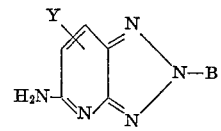

wherein Y is selected from the group consisting of hydrogen, lower alkyl, halogen, carboxy, lower carbalkoxy, and unsubstituted carboxamide and B is 5-pyrimidyl, and (2) quaternary salts of (1) with an alkylating agent selected from the group consisting of methyl iodide, ethyl bromide, butyl bromide, benzyl bromide, dimethyl sulfate, diethyl sulfate, ethylene chlorohydrin, beta-diethylamino ethyl chloride and methyl tosylate.

2. The compound

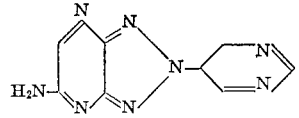

No references cited.

NICHOLAS S. RIZZO, *Primary Examiner.*

CERTIFICATE OF CORRECTION

Patent No. 3,211,733            October 12, 1965

Bennett George Buell et al.

It is hereby certified that error appears in the above numbered patent requiring correction and that the said Letters Patent should read as corrected below.

Column 11, lines 55 to 63, the formula should appear as shown below instead of as in the patent:

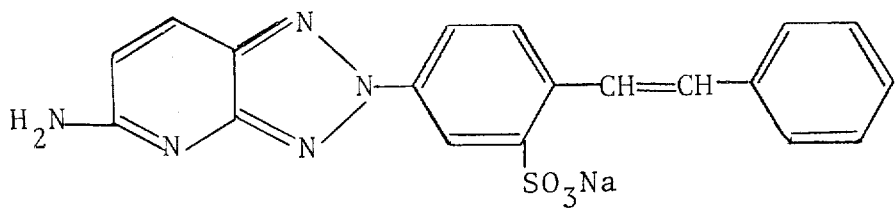

column 13, lines 56 to 64, the formula should appear as shown below instead of as in the patent:

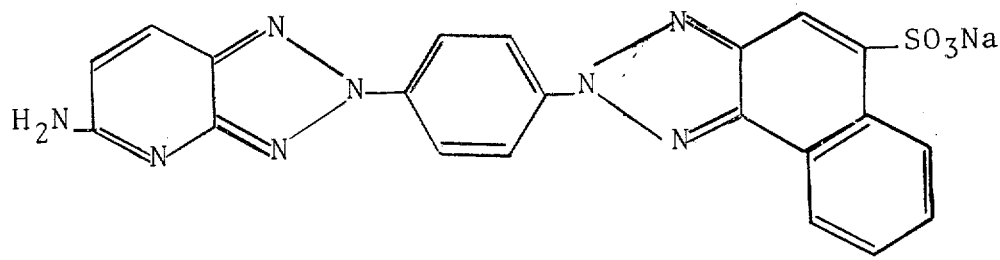

column 24, lines 2 to 6 the formula should appear as shown below instead of as in the patent:

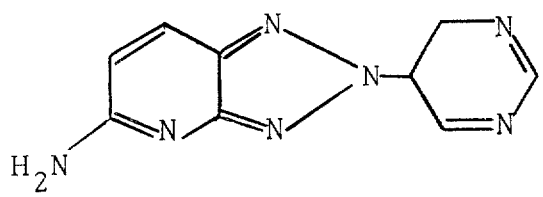

Signed and sealed this 5th day of July 1966.

(SEAL)
Attest:

ERNEST W. SWIDER
Attesting Officer

EDWARD J. BRENNER
Commissioner of Patents